Patented Jan. 5, 1926.

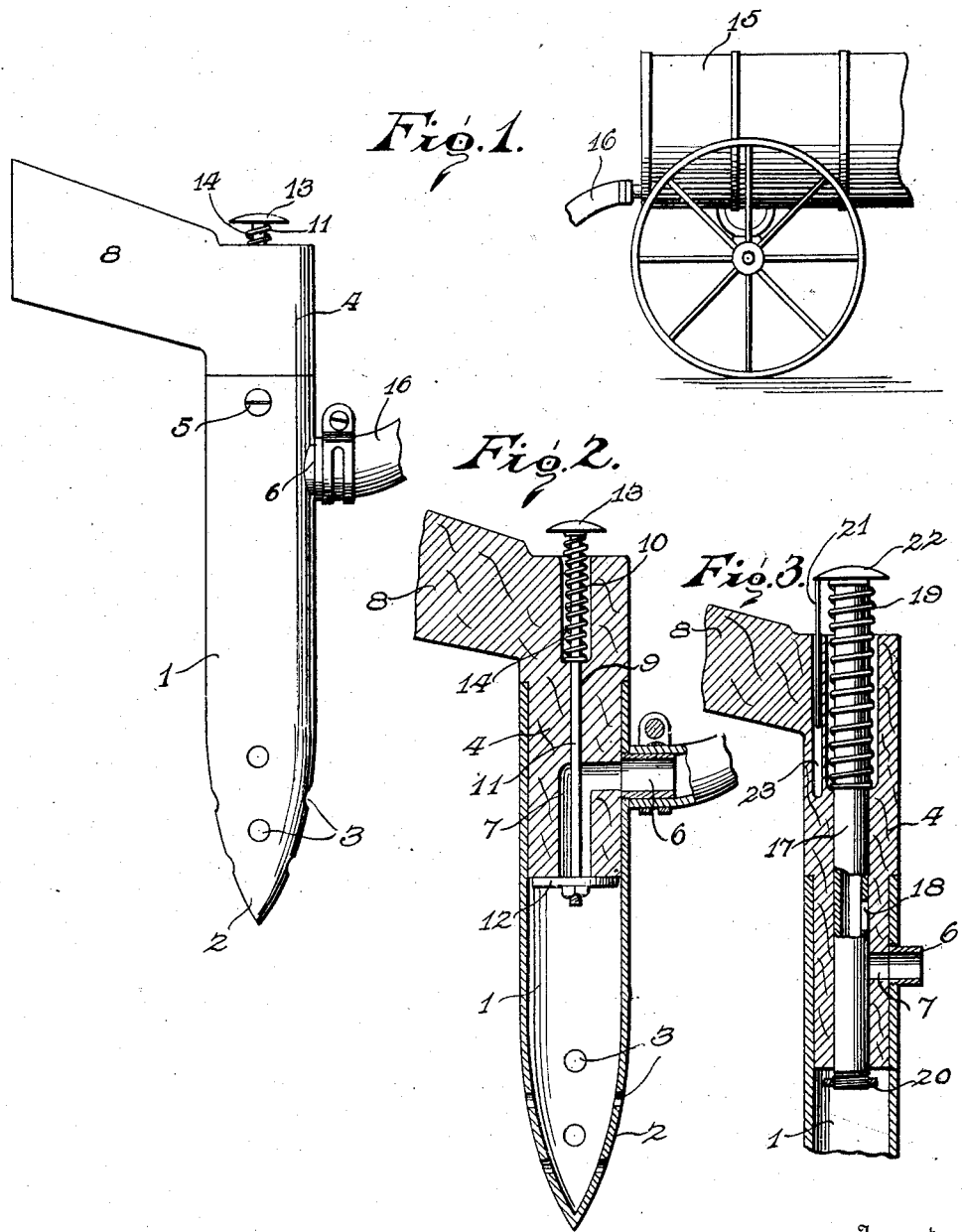

1,568,580

UNITED STATES PATENT OFFICE.

SAMUEL P. WRIGHT, OF FRANKLIN, KENTUCKY.

PLANT SETTER.

Application filed July 21, 1924. Serial No. 727,275.

*To all whom it may concern:*

Be it known that I, SAMUEL P. WRIGHT, a citizen of the United States, residing at Franklin, in the county of Simpson and State of Kentucky, have invented certain new and useful Improvements in Plant Setters, of which the following is a specification.

My invention is a device for use in setting out young plants and its object is to provide a simple implement whereby holes to receive the plants may be easily formed in the ground and water supplied so that the plants may be set out in dry weather and will quickly take root. The invention is illustrated in the accompanying drawing and consists in certain novel features which will be hereinafter fully set forth.

In the drawing:

Figure 1 is an elevation of my improved device;

Fig. 2 is a vertical section of the same, and

Fig. 3 is a vertical section showing a second embodiment of the invention.

In carrying out my invention, I employ a tubular body 1 which is tapered at its lower end, as shown at 2, whereby it forms a point which will readily enter the ground. Openings 3 are formed in the lower portion of the tube so as to permit water which is supplied thereto to readily flow out and enter the ground and supply the moisture necessary to maintain life in the young plants. The upper end of the tube is closed by a plug 4 fitted snugly therein and secured in place by a screw 5 or other fastening device inserted through the wall of the tube into the plug in an obvious manner, the tube being provided with an inlet opening defined by a nipple 6 and the plug having a passage 7 formed in its lower end to aline axially with the nipple and extend therefrom through the lower end of the plug, as shown clearly in Fig. 2. The plug may be provided at its upper extremity with a lateral handle 8 of any approved form whereby it may be easily held in the hand of the user and through the upper portion of the plug is formed a longitudinal passage 9 which opens at its lower end into the passage 7 and is expanded at its upper end, as shown at 10. A valve stem 11 is fitted slidably through the passage 9 and fits closely but easily therein, the stem extending through the passage 7 to a point below the same and also upwardly through the enlarged bore 10 at the upper end of the passage, as clearly shown. A disk valve 12 is secured upon the lower end of the stem 11 and is adapted to seat against the lower end of the plug so as to close the passage 7 and thereby normally cut off the flow of water into the tubular body 1. The upper extremity of the stem 11 is equipped with a knob or other handle member 13 and between the said handle member and the shoulder defined by the lower end of the bore 10 a spring 14 is coiled around the stem, the said spring being normally expanded so as to hold the valve 12 in its closed position, as shown in Fig. 2.

In the use of the device, a supply of water is provided in a tank or reservoir 15 which may be of any convenient form and is illustrated conventionally in Fig. 1 as a watering cart, a hose 16 being utilized to connect the outlet of the tank with the nipple 6 of the plant setter. The hose 16 may be of any desired or convenient length so that the water supply may be temporarily held at one point in the field and the plant setter carried from hill to hill successively within the range of the hose so as to effect the transplanting operation. The plant setting is started at a point remote from the point where the water supply is stationed and is performed through the rows of hills successively until all the rows within the limit of the hose have been planted and the implement has reached a point immediately adjacent the tank or other form of reservoir. The cart is then driven to another point in the field so that the plant setting may be continued. In setting out the plants, the tubular body 1 is forced into the ground at the point where the plant is to be set and simultaneously with the entering of the tube the valve may be opened to admit a flow of water into the same. As the point of the tube descends in the ground, a hole will obviously be formed and the water will, of course, penetrate the walls of the hole. When a sufficient supply of water has been permitted to flow into the hole, the tool is withdrawn, the flow of water being cut off, and the plant is placed in the hole and the loose earth filled in around the roots in the usual manner. Of course, the valve may remain seated until the point of the tool has penetrated the ground to the desired depth, after which pressure may be put upon the knob 13 to unseat the valve and admit the water. Immediately upon release of the pressure, the spring 14 will expand and return the valve to its seated position so as to cut off the flow.

The embodiment of the invention illustrated in Fig. 3 corresponds in all respects to the previously described form except that a somewhat different form of valve is employed. In this arrangement, the valve consists of a tubular stem 17 having a port 18 in one side adapted to register with the inlet passage 7 of the plug 4 when the valve is depressed, the lower end of the stem being open so as to permit escape of the water into the tubular body 1. As shown in Fig. 3, a spring 19 is provided around the upper portion of the tubular valve 17 to hold it normally raised, in which position the port 18 will be above the inlet 7 and the body of the stem or valve will extend across the said port to cut off the inflow of water. To limit the upward closing movement of the valve and prevent it being thrown entirely from the plug by the force of the spring 19, a stop collar 20 may be fitted upon the lower end of the valve to abut the lower end of the plug, as will be understood. When the flow of water is to be set up, slight pressure is exerted upon the upper end of the valve against the tension of the spring 19 so that the valve will be depressed and the port 18 brought into alinement with the inlet port 7, whereupon the water will at once flow into and through the valve. To prevent turning movement of the tubular valve, a guide pin 21 is fixed to or formed on the knob 22 and plays in a guide passage 23 provided in the plug 4.

It will be readily noted from the foregoing description taken in connection with the accompanying drawing, that I have provided an exceedingly simple device which may be easily manipulated and by the use of which young plants may be set out notwithstanding unfavorable weather conditions, and the soil moistened so that the life of the plants will be maintained and they will quickly take root.

Having thus described the invention, I claim:

1. An implement for forming plant-receiving openings and supplying moisture thereto, the same comprising a tubular body pointed at its lower end and having discharge openings in the sides of the point, and having a lateral inlet in a side near its upper end, a plug fitted within the upper portion of the body and having a passage in communication with the said inlet, a valve within the body and normally preventing outflow through the passage of the said plug and having its stem passing through the plug, and a spring coiled about the stem of the valve and seated within the plug and normally holding the valve in closed position.

2. An implement for forming plant-receiving openings and supplying moisture thereto, the same comprising a tubular body pointed at its lower end and having discharge openings in the sides of the point, and having a lateral inlet in a side near its upper end, a plug fitted within the upper portion of the body and having a passage in communication with the said inlet, and having an axial opening which is enlarged at its upper end, said plug projecting beyond the body and terminating in a lateral extension forming a handle, a valve for controlling the outflow through the passage of the plug and having a portion extending through the passage and axial opening of the plug and terminating in a pressure knob, and a spring within the enlargement of the axial opening and coiled about the portion of the valve passing therethrough and confined between the bottom of said enlargement and the knob of the valve.

In testimony whereof I affix my signature.

SAMUEL P. WRIGHT. [L. S.]